(12) United States Patent
Zhu et al.

(10) Patent No.: US 8,903,353 B2
(45) Date of Patent: Dec. 2, 2014

(54) METHOD AND SYSTEM FOR PROCESSING PRIOR SERVICES

(75) Inventors: Chunhui Zhu, Shenzhen (CN); Zhongda Du, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 155 days.

(21) Appl. No.: 13/817,768

(22) PCT Filed: Jul. 27, 2011

(86) PCT No.: PCT/CN2011/077664
§ 371 (c)(1),
(2), (4) Date: Feb. 19, 2013

(87) PCT Pub. No.: WO2012/025001
PCT Pub. Date: Mar. 1, 2012

(65) Prior Publication Data
US 2013/0143515 A1 Jun. 6, 2013

(30) Foreign Application Priority Data

Aug. 23, 2010 (CN) .......................... 2010 1 0262023

(51) Int. Cl.
*H04M 11/04* (2006.01)
*H04W 76/00* (2009.01)
*H04W 76/02* (2009.01)
*H04W 68/02* (2009.01)

(52) U.S. Cl.
CPC .......... *H04W 76/007* (2013.01); *H04W 76/027* (2013.01); *H04W 68/02* (2013.01)
USPC .................. 455/404.1; 455/435.1; 455/435.3; 455/445

(58) Field of Classification Search
None
See application file for complete search history.

(56) References Cited

U.S. PATENT DOCUMENTS

2011/0103277 A1* 5/2011 Watfa et al. ................... 370/310
2012/0002545 A1* 1/2012 Watfa et al. ................... 370/235

FOREIGN PATENT DOCUMENTS

| CN | 101222750 A | 7/2008 |
|---|---|---|
| CN | 101296509 A | 10/2008 |
| CN | 101577890 A | 11/2009 |
| CN | 101730034 A | 6/2010 |
| JP | 2011166455 A | 8/2011 |
| JP | 2012515475 A | 7/2012 |
| JP | 2013510471 A | 3/2013 |
| WO | 2010081223 A1 | 7/2010 |
| WO | 2010081233 A1 | 7/2010 |
| WO | 2011054089 A1 | 5/2011 |

OTHER PUBLICATIONS

3GPP TSG RAN WG2 Meeting #70bis, LS on support for Priority for terminating sessions for MPS, Sweden, Jun. 28, 2010, 2 total pages.

(Continued)

*Primary Examiner* — Suhail Khan
(74) *Attorney, Agent, or Firm* — Oppedahl Patent Law Firm LLC

(57) ABSTRACT

The disclosure discloses a method and a system for processing prior services, the method includes that: an eNB and/or an MME carries a service priority indication in a message sent to a UE in mobile terminating call procedures for CSFB; and the UE sends a GERAN or a UTRAN a priority indication corresponding to a service when the GERAN or the UTRAN initiates the service. With the disclosure, a source network E-UTRAN can take full advantage of an existing message to carry service information to notify a UE, the UE forwards the information to a target network GERAN/UTRAN, so as to avoid failure of a high priority service in the target network.

13 Claims, 6 Drawing Sheets

(56) References Cited

OTHER PUBLICATIONS

3GPP TSG RAN WG2 Meeting #70bis, LS response on support for Priority for terminating sessions for MPS, Sweden, Jun. 28, 2010, 1 total page.
3GPP TSG-RAN WG3 #69, Prioritised handling of MPS sessions in S1-AP, Spain, Aug. 23, 2010, 2 total pages.
International Search Report on international application No. PCT/CN2011/077664, mailed on Oct. 20, 2011.
English Translation of the Written Opinion of the International Search Authority in international application No. PCT/CN2011/077664, mailed on Oct. 20, 2011.

* cited by examiner

METHOD AND SYSTEM FOR PROCESSING PRIOR SERVICES

TECHNICAL FIELD

The disclosure relates to the field of communications, in particular to a method and a system for processing prior services.

BACKGROUND

A multimedia priority service refers to a priority service initiated by an official of a government department such as the departments of state security and emergency affairs using a public network, in which case it is required to support the service preferentially under certain specific occasions such as when a jam occurs at the core network (CN) side or radio side of the communication network.

As shown in FIG. 1, when a voice call with high priority reaches the network at the side of a called user, the called user accesses from an Evolved universal Terrestrial Radio Access Network (E-UTRAN) consisting of eNBs (evolved Node B); a Mobile Switching Center (MSC)/Visitor Location Register (VLR) (wherein MSC and VLR are commonly used simultaneously) receives the incoming call request and sends a Circuit Switched (CS) paging request message via an interface between the MSC/VLR and a Mobility Management Entity (MME); the MME receives the CS paging request message and performs call Circuit Switched Fallback. In this case, a User Equipment (UE) is connected to the MSC via a GSM (Global System for Mobile communications) EDGE (Enhanced Data Rates for GSM Evolution) Radio Access Network (GERAN) or a Universal Terrestrial Radio Access Network (UTRAN).

As shown in FIG. 2, an existing Circuit Switched Fallback flow primarily includes the following steps.

Step 201. A UE has a call and the UE is the called user, at this moment the UE is in an idle state and has no connection with a network. An MSC of a called network in which the UE is located receives an initial address message of an incoming call request. A calling party of the incoming call request is a user with high priority, wherein a priority indication is included in the incoming call request; an MSC/VLR receives the incoming request, starts paging the called user, and sends an MME a CS paging request including a priority indication according to stored information on relevance relation and the like.

Step 202. The MME receives the CS paging request message sent by the MSC/VLR, starts paging the UE, and sends an eNB a paging message including a priority indication.

Step 203. The eNB sends the UE a paging message.

Step 204. The UE receives the paging message and sends the MME an extended service request.

Step 205. The MME sends the eNB a UE context SETUP request including a CS Fall Back (CSFB) indication and a priority indication.

Step 206. The eNB sends the MME a UE context SETUP answer message.

Step 207. The eNB decides to use a redirection mechanism and initiates a radio connection release to instruct the UE to redirect the UE itself to 2G/3G to perform a circuit domain service.

Step 208. The UE initiates radio connection at a GERAN/UTRAN, at this moment, as the GERAN/UTRAN is in a jammed state and incapable of processing a user service request, the UE is thereby unable to access a circuit domain service, leading to failure of the call.

A similar situation occurs when the UE is in a connected state (namely, the UE has a connection with a network), as shown in FIG. 3, a CSFB flow primarily includes the following steps.

Step 301. A UE has a call and the UE is the called user, at this moment the UE is in a connected state and has an existing connection with a network. An MSC of a called network in which the UE is located receives an initial address message of an incoming call request. A calling party of the incoming call request is a user with high priority, wherein a priority indication is included in the incoming call request; an MSC/VLR receives the incoming request, starts paging the called user, and sends an MME a CS paging request including an priority indication according to stored information on relevance relation and the like.

Step 302. A connection exists between the UE and the MME, and the MME directly sends the UE a CS service notifying message.

Step 303. The UE receives the CS service notifying message and sends the MME an extended service request.

Step 304. The MME sends the eNB a UE context modifying request including a CSFB indication and a priority indication.

Step 305. The eNB sends the MME a UE context modifying answer message.

Step 306. The eNB decides to use a redirection mechanism and initiates a radio connection release to instruct the UE to redirect the UE itself to 2G/3G to perform a circuit domain service.

Step 307. The UE initiates radio connection at a GERAN/UTRAN, at this moment as the GERAN/UTRAN is in a jammed state and incapable of processing a user service request, the UE is thereby unable to access a circuit domain service, leading to failure of the call.

A circuit domain call with priority is not guaranteed to succeed in an existing art when a GERAN/UTRAN is overloaded due to the aforementioned situation.

SUMMARY

Accordingly, the primary objective of the present disclosure is to provide a method and a system for processing prior services, so as to solve the problem that a priority service of the existing art is unable to be guaranteed to succeed when GERAN/UTRAN is overloaded.

To achieve the aforementioned objective, the technical solution of the disclosure is implemented as follows.

The disclosure provides a method for processing prior services, including:

carrying, by an evolved Node B (eNB) and/or a Mobility Management Entity (MME), a service priority indication in a message sent to a User Equipment (UE) in mobile terminating call procedures for Circuit Switched Fallback (CSFB); and sending, by the UE, a priority indication corresponding to a service to a GSM EDGE Radio Access Network (GERAN) or a Universal Terrestrial Radio Access Network (UTRAN) when the GERAN or the UTRAN initiates the service.

The method may further include: carrying, by the eNB, the service priority indication via a radio connection releasing request message and/or a paging message sent to the UE when the UE is in an idle state.

The method may further include: when the UE is in a connected state, carrying, by the MME, the service priority indication via a Circuit Switched (CS) service notifying message sent to the UE, and/or carrying, by the eNB, the service priority indication via a radio connection releasing request message sent to the UE.

The sending, by the UE, a priority indication corresponding to a service to a GERAN when the GERAN initiates the service may specifically include:

sending, by the UE, a channel request message to the GERAN, wherein an establishment cause in the request message serves as the priority indication, and the establishment cause is filled in as an emergency call.

The sending, by the UE, a priority indication corresponding to a service to a UTRAN when the UTRAN initiates the service may specifically include:

sending, by the UE, a radio resource connection SETUP request message to the UTRAN, wherein an establishment cause in the request message serves as the priority indication, and the establishment cause is filled in as a terminating high priority signaling or an emergency call.

The disclosure further provides a system for processing prior services, including a User Equipment (UE), an evolved Node B (eNB), and a Mobility Management Entity (MME), wherein the eNB and/or the MME is configured to carry a service priority indication in a message sent to the UE in mobile terminating call procedures for Circuit Switched Fallback (CSFB); and the UE is configured to send a priority indication corresponding to a service to a GSM EDGE Radio Access Network (GERAN) or a Universal Terrestrial Radio Access Network (UTRAN) when the GERAN or the UTRAN initiates the service.

The eNB may be further configured to carry the service priority indication via a radio connection releasing request message and/or a paging message sent to the UE when the UE is in an idle state.

The MME may be further configured to carry the service priority indication via a Circuit Switched (CS) service notifying message sent to the UE when the UE is in a connected state.

The eNB may be further configured to carry the service priority indication via a radio connection releasing request message sent to the UE when the UE is in a connected state.

The UE may be further configured to send a channel request message to the GERAN, wherein an establishment cause in the request message serves as the priority indication, and the establishment cause is filled in as an emergency call.

The UE may be further configured to send a radio resource connection SETUP request message to the UTRAN, wherein an establishment cause in the request message serves as the priority indication, and the establishment cause is filled in as a terminating high priority signaling or an emergency call.

With the method and the system for processing prior services provided by the disclosure, the method includes that: an eNB and/or an MME carries a service priority indication in a message sent to a UE in mobile terminating call procedures for CSFB; and the UE sends a GERAN or a UTRAN a priority indication corresponding to a service when the GERAN or the UTRAN initiates the service. With the disclosure, the source network E-UTRAN can take full advantage of an existing message to carry service information to notify the UE, and the UE forwards the information to a target network GERAN/UTRAN, so as to avoid failure of a high priority service in the target network.

DETAILED DESCRIPTION

The technical solution of the disclosure is further elaborated hereinafter with reference to the figures and specific embodiments.

Figure 1:
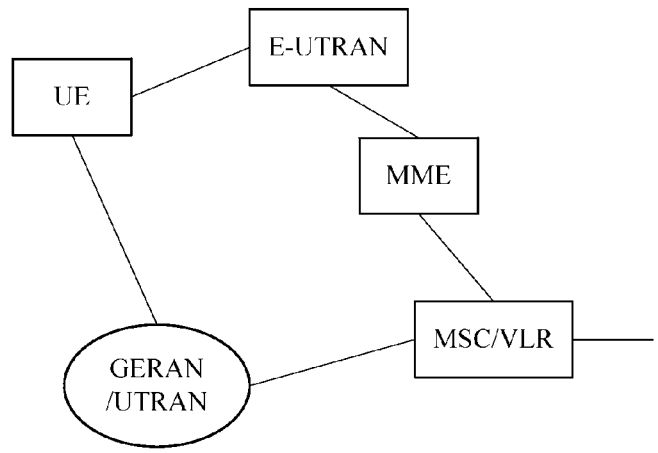
FIG. 1 is a schematic view of a network of CSFB in an existing art.
Figure 2:
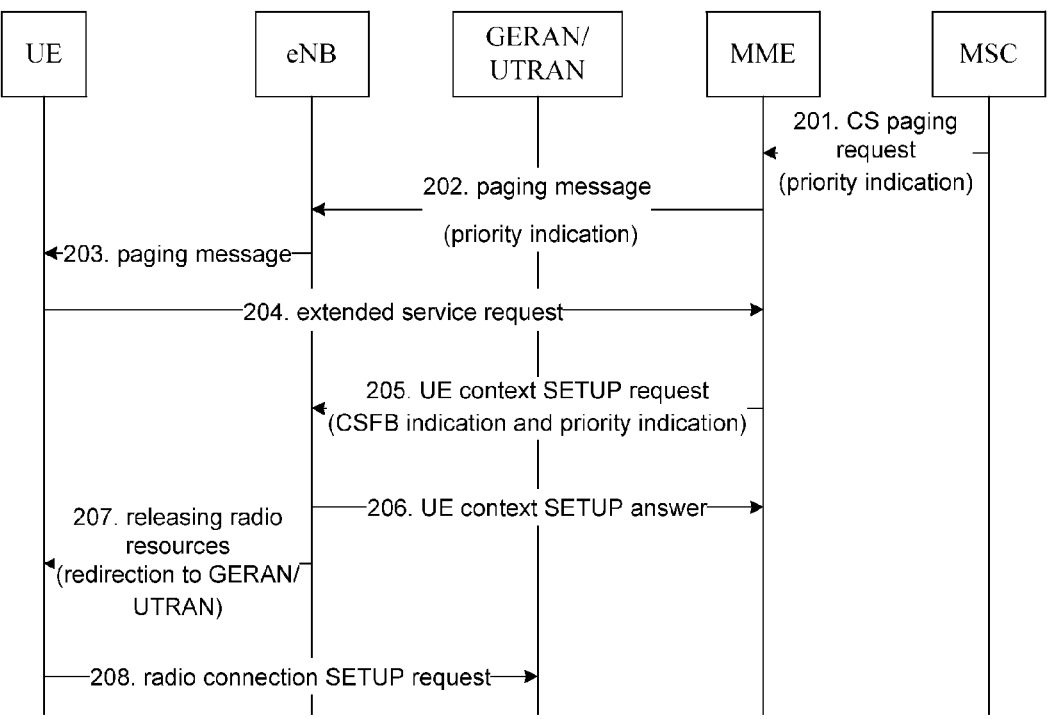
FIG. 2 is a flowchart of CSFB when a UE is in an idle state in an existing art.
Figure 3:
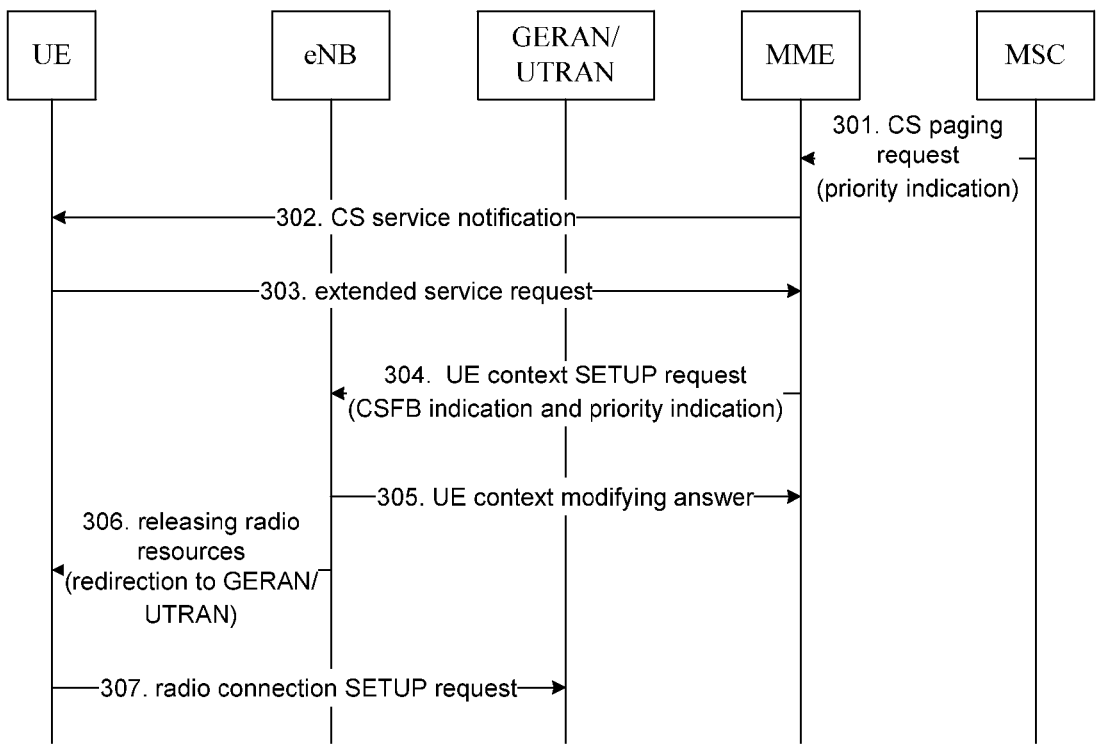
FIG. 3 is a flowchart of CSFB when a UE is in a connected state in an existing art.
Figure 4:
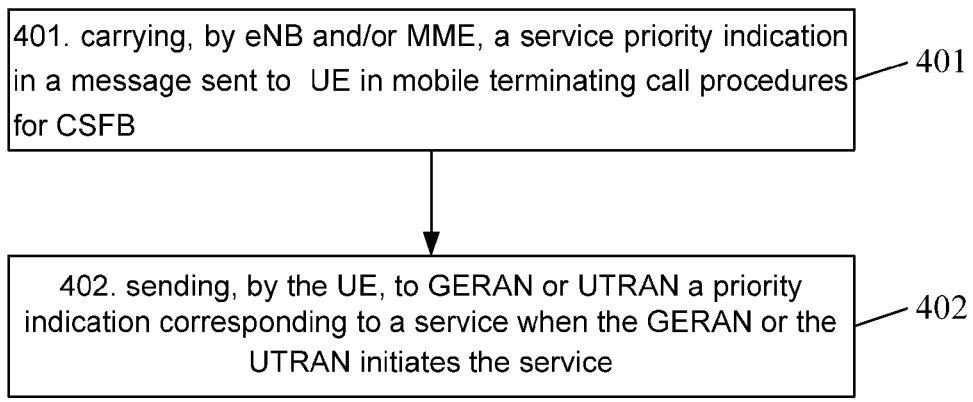
FIG. 4 is a flowchart of a method for processing prior services according to the disclosure.

As shown in FIG. 4, a method for processing prior services provided by the disclosure mainly includes the following steps.

Step 401. An eNB and/or an MME carries a service priority indication in a message sent to a UE in mobile terminating call procedures for CSFB.

Wherein, the eNB may carry a priority indication corresponding to a service via a radio connection releasing request message and/or a paging message sent to the UE when the UE is in an idle state. When the UE is in a connected state, the MME may carry a priority indication corresponding to a service via a CS service notifying message sent to the UE; and/or the eNB may carry a priority indication corresponding to a service via a radio connection releasing request message sent to the UE.

Step 402. The UE sends a GERAN or a UTRAN a priority indication corresponding to a service when the GERAN or the UTRAN initiates the service.

The aforementioned method for processing prior services is further elaborated below with specific embodiments.

Figure 5:
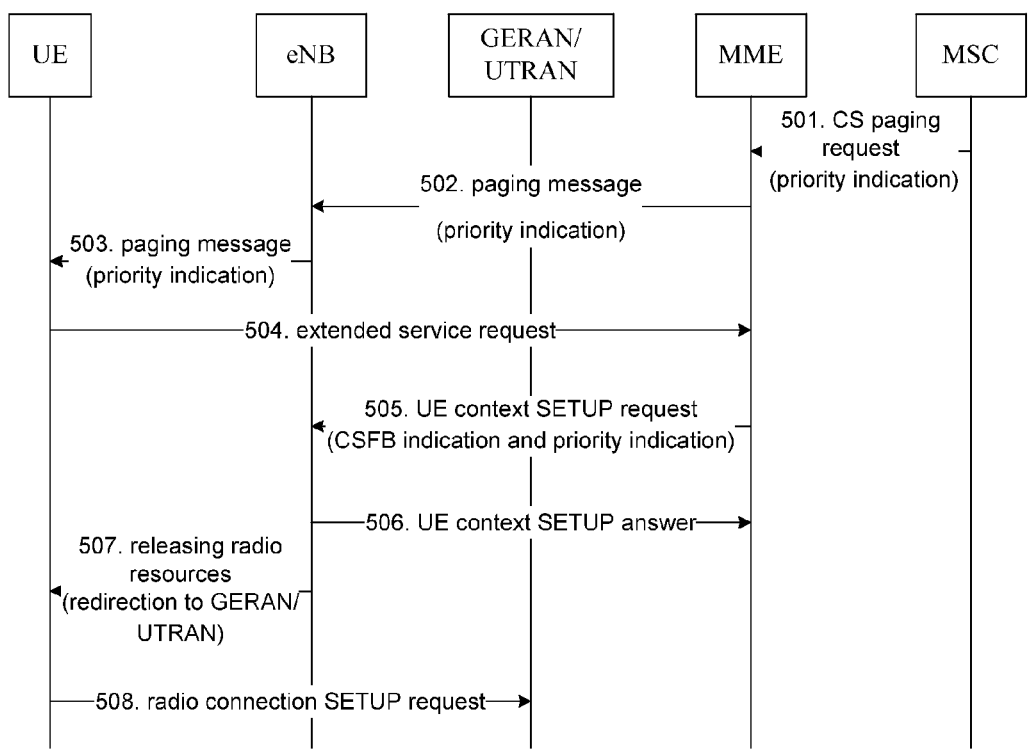
FIG. 5 is a flowchart of a method for processing prior services according to Embodiment 1 of the disclosure.

Embodiments 1 and 2 of the disclosure occurs when the UE is in an idle state, and a preferred method for processing prior services shown in FIG. 5 specifically includes the following steps.

Step 501. The UE has a call, and the UE is the called party, at this moment the UE is in an idle state and has no connection with a network. An MSC of a called network in which the UE is located receives an initial address message of an incoming call request. A calling party of the incoming call request is a user with high priority, with a priority indication included in the incoming call request; an MSC/VLR receives the incoming call request, starts to page the called user, and sends the MME a CS paging request message according to stored information on relevance relation and the like, wherein the CS paging request message includes a priority indication.

Step 502. The MME receives the CS paging request message sent by the MSC/VLR, starts to page the UE, and sends the eNB a paging message including a priority indication.

Step 503. The eNB sends the UE a paging message including a priority indication, wherein the priority indication may be expressed with 1 bit and is configured to indicate high priority.

Step 504. The UE receives the paging message, stores the priority indication therein, and sends the MME an extended service request message.

Step 505. The MME sends the eNB a UE context SETUP request message including a CSFB indication and a priority indication.

Step 506. The eNB sends the MME a UE context SETUP answer message.

Step 507. The eNB decides to use a redirection mechanism and initiates a radio connection release, namely, sending the UE a radio connection releasing request message, instructing the UE to redirect the UE itself to 2G/3G to perform a circuit domain service.

Step 508. The UE initiates at a GERAN/UTRAN a radio connection SETUP request message through which the UE carries the priority indication to be notified to the GERAN/UTRAN.

When the UE is connected to the GERAN, the request message may be a channel request message, and the priority indication therein may be an establishment cause, which may be an emergency call; when the UE is connected to the UTRAN, the request message may be an RRC (Radio Resource Control) Connection SETUP Request message, and the establishment cause included therein may be a terminating High Priority Signaling or an emergency call. The GERAN/UTRAN receives the request message, and then preferentially processes the request message and allocates resources according to a value of the establishment cause included in the request message.

Figure 6:
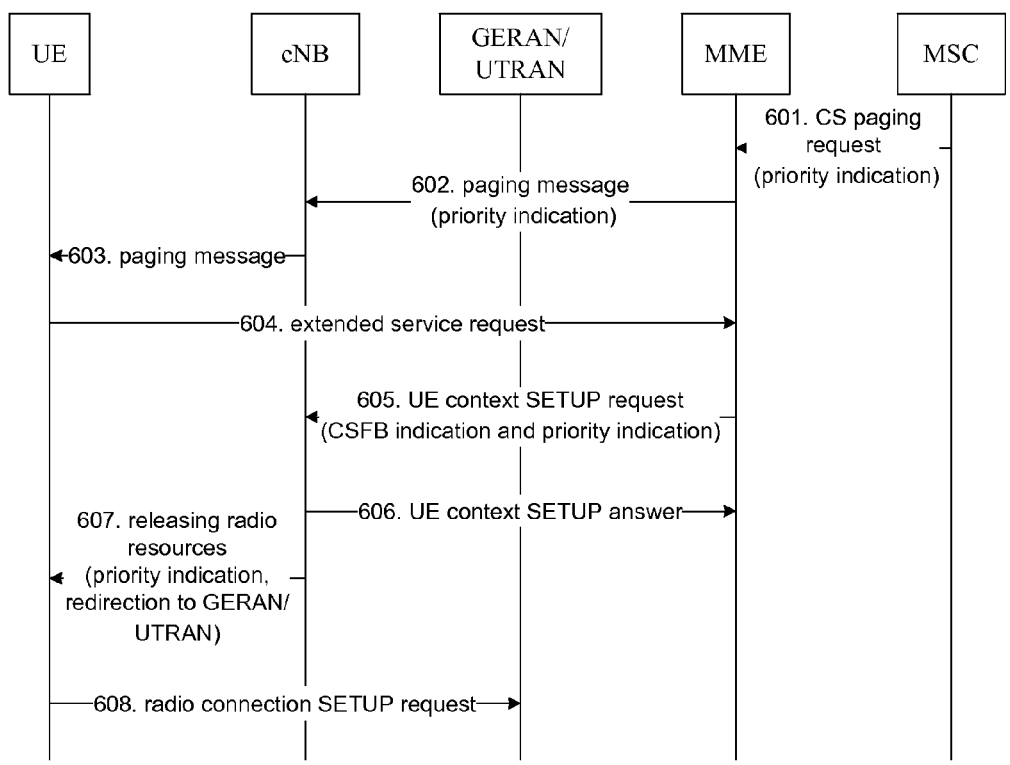
FIG. 6 is a flowchart of a method for processing prior services according to Embodiment 2 of the disclosure.

A method for processing prior services shown in FIG. 6 specifically includes the following steps.

Step 601. The UE has a call, and the UE is the called party, at this moment the UE is in an idle state and has no connection with a network. The MSC of the called network in which the UE is located receives an initial address message of an incoming call request. The calling party of the incoming call request is a user with high priority, with a priority indication included in the incoming call request; the MSC/VLR receives the incoming call request, starts to page the called user, and sends the MME a CS paging request message according to stored information on relevance relation and the like, wherein the CS paging request message includes a priority indication.

Step 602. The MME receives the CS paging request message sent by the MSC/VLR, starts to page the UE, and sends the eNB a paging message including a priority indication Step 603. The eNB sends the UE a paging message.

Step 604. The UE receives the paging message and sends the MME an extended service request message.

Step 605. The MME sends the eNB a UE context SETUP request message including a CSFB indication and a priority indication.

Step 606. The eNB sends the MME a UE context SETUP answer message.

Step 607. The eNB decides to use a redirection mechanism and initiates a radio connection release, namely, sending the UE a radio connection releasing request message, instructing the UE to redirect the UE itself to 2G/3G to perform a circuit domain service; and the request message includes a priority indication that may be expressed with 1 bit and configured to indicate high priority. The UE receives the radio connection releasing request message and stores the priority indication therein.

Step 608. The UE initiates at the GERAN/UTRAN a radio connection SETUP request message through which the UE carries the priority indication to be notified to the GERAN/UTRAN.

When the UE is connected to the GERAN, the request message may be a channel request message, and the priority indication therein may be an establishment cause, which may be an emergency call; when the UE is connected to the UTRAN, the request message may be an RRC (Radio Resource Control) Connection SETUP Request message, and the establishment cause included therein may be a terminating High Priority Signaling or an emergency call. The GERAN/UTRAN receives the request message, and then preferentially processes the request message and allocates resources according to a value of the establishment cause included in the request message.

Figure 7:
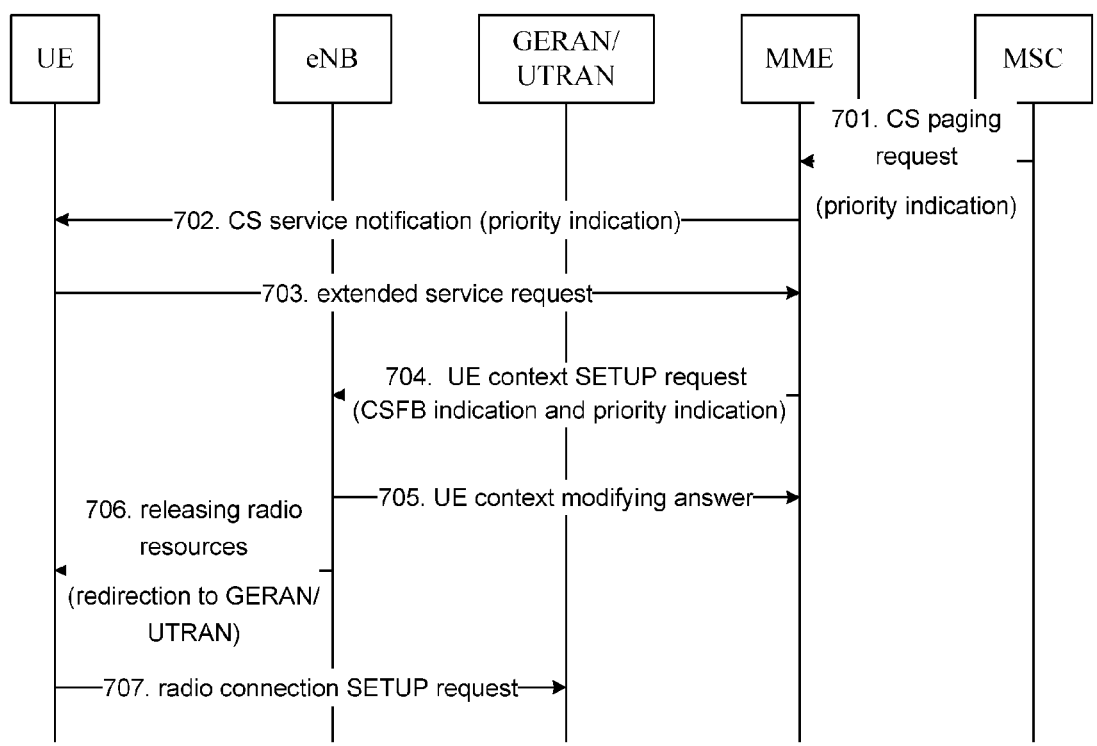
FIG. 7 is a flowchart of a method for processing prior services according to Embodiment 3 of the disclosure.

Embodiments 3 and 4 of the disclosure occurs when the UE is in a connected state, and a preferred method for processing prior services shown in FIG. 7 specifically includes the following steps.

Step 701. The UE has a call, and the UE is the called party, at this moment the UE is in a connected state and has a connection with a network. The MSC of the called network in which the UE is located receives an initial address message of an incoming call request. The calling party of the incoming call request is a user with high priority, with a priority indication included in the incoming call request; the MSC/VLR receives the incoming call request, starts to page the called user, and sends the MME a CS paging request message according to stored information on relevance relation and the like, wherein the CS paging request message includes a priority indication.

Step 702. There exists a connection between the UE and the MME, and the MME directly sends the UE a CS service notifying message including a priority indication, wherein the priority indication may be expressed with 1 bit and is configured to indicate high priority.

Step 703. The UE receives the CS service notifying message, stores the priority indication therein, and sends the MME an extended service request message.

Step 704. The MME sends the eNB a UE context modifying request message including a CSFB indication and a priority indication.

Step 705. The eNB sends the MME a UE context modifying answer message.

Step 706. The eNB decides to use a redirection mechanism and initiates a radio connection release, namely, sending the UE a radio connection releasing request message, instructing the UE to redirect the UE itself to 2G/3G to perform a circuit domain service.

Step 707. The UE initiates at the GERAN/UTRAN a radio connection SETUP request message through which the UE carries the priority indication to be notified to the GERAN/UTRAN.

When the UE is connected to the GERAN, the request message may be a channel request message, and the priority indication therein may be an establishment cause, which may be an emergency call; when the UE is connected to the UTRAN, the request message may be an RRC (Radio Resource Control) Connection SETUP Request message, and the establishment cause included therein may be a terminating High Priority Signaling or an emergency call. The GERAN/UTRAN receives the request message, and then preferentially processes the request message and allocates resources according to a value of the establishment cause included in the request message.

Figure 8:
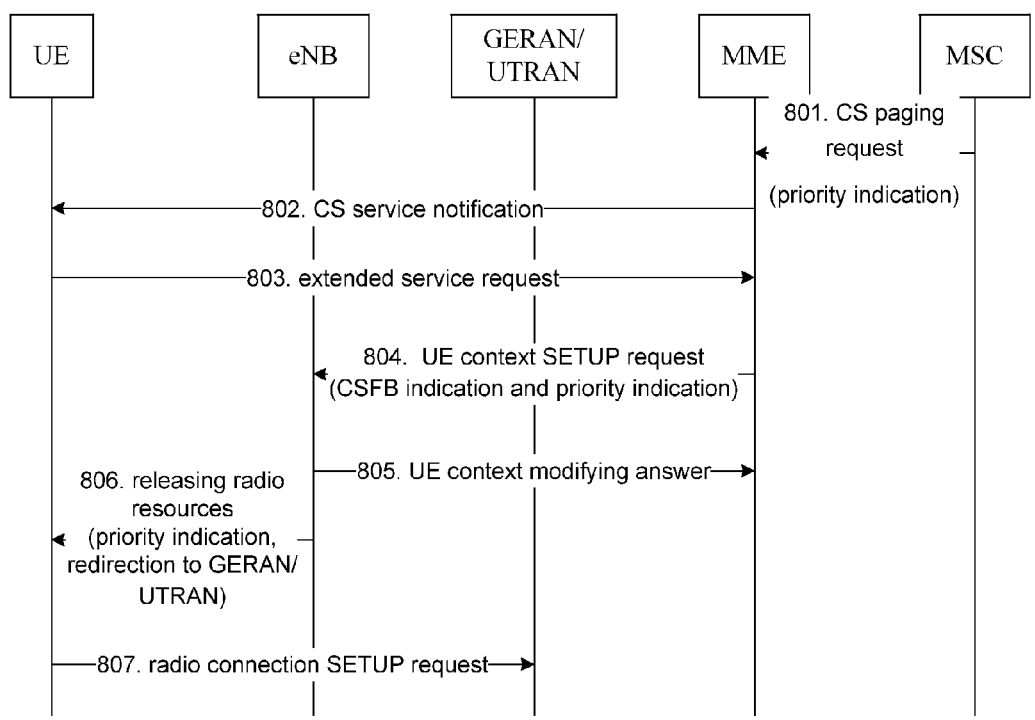
FIG. 8 is a flowchart of a method for processing prior services according to Embodiment 4 of the disclosure.

A method for processing prior services shown in FIG. 8 specifically includes the following steps.

Step 801. The UE has a call, and the UE is the called party, at this moment the UE is in a connected state and has a connection with a network. The MSC of the called network in which the UE is located receives an initial address message of an incoming call request. The calling party of the incoming call request is a user with high priority, with a priority indication included in the incoming call request; the MSC/VLR receives the incoming call request, starts to page the called user, and sends the MME a CS paging request message according to stored information on relevance relation and the like, wherein the CS paging request message includes a priority indication.

Step 802. There exists a connection between the UE and the MME, and the MME directly sends the UE a CS service notifying message.

Step 803. The UE receives the CS service notifying message and sends the MME an extended service request message.

Step 804. The MME sends the eNB a UE context modifying request message including a CSFB indication and a priority indication.

Step 805. The eNB sends the MME a UE context modifying answer message.

Step 806. The eNB decides to use a redirection mechanism and initiates a radio connection release, namely, sending the UE a radio connection releasing request message, instructing the UE to redirect the UE itself to 2G/3G to perform a circuit domain service; and the request message includes a priority indication that may be expressed with 1 bit and configured to indicate high priority. The UE receives the radio connection releasing request message and stores the priority indication therein.

Step 807. The UE initiates at the GERAN/UTRAN a radio connection SETUP request message through which the UE carries the priority indication to be notified to the GERAN/UTRAN.

When the UE is connected to the GERAN, the request message may be a channel request message, and the priority indication therein may be an establishment cause, which may be an emergency call; when the UE is connected to the UTRAN, the request message may be an RRC (Radio Resource Control) Connection SETUP Request message, and the establishment cause included therein may be a terminating High Priority Signaling or an emergency call. The GERAN/UTRAN receives the request message, and then preferentially processes the request message and allocates resources according to a value of the establishment cause included in the request message.

Corresponding to the aforementioned method for processing prior services, the present disclosure further provides a system for processing prior services, including a UE, an eNB, and an MME, wherein the eNB and/or the MME is configured to carry a service priority indication in a message sent to the UE in mobile terminating call procedures for CSFB. The UE is configured to, when a GERAN or a UTRAN initiates a service, send the GERAN or the UTRAN a priority indication corresponding to the service.

Preferably, the eNB is further configured to carry the service priority indication via a radio connection releasing request message and/or a paging message sent to the UE when the UE is in an idle state.

Preferably, the MME is further configured to carry the service priority indication via a CS service notifying message sent to the UE when the UE is in a connected state.

Preferably, the eNB is further configured to carry the service priority indication via a radio connection releasing request message sent to the UE when the UE is in a connected state.

To sum up, with the present disclosure, a source network E-UTRAN can take full advantage of an existing message to carry service information to notify a UE, the UE forwards the information to a target network GERAN/UTRAN, so as to avoid failure of a high priority service in the target network.

The aforementioned are merely preferred embodiments of the disclosure and are not intended to limit the scope of the disclosure.

The invention claimed is:

1. A method for processing prior services, comprising:
    carrying, by an evolved Node B (eNB) and/or a Mobility Management Entity (MME), a priority indication corresponding to a service in a message sent to a User Equipment (UE) in mobile terminating call procedures for Circuit Switched Fallback (CSFB); and
    sending, by the UE, the priority indication to a GSM EDGE Radio Access Network (GERAN) or a Universal Terrestrial Radio Access Network (UTRAN) when the GERAN or the UTRAN initiates the service.

2. The method for processing prior services according to claim 1, further comprising: carrying, by the eNB, the priority indication corresponding to the service via a radio connection releasing request message and/or a paging message sent to the UE when the UE is in an idle state.

3. The method for processing prior services according to claim 1, further comprising: when the UE is in a connected state, carrying, by the MME, the priority indication corresponding to the service via a Circuit Switched (CS) service notifying message sent to the UE, and/or carrying, by the eNB, the priority indication corresponding to the service via a radio connection releasing request message sent to the UE.

4. The method for processing prior services according to claim 1, wherein the sending, by the UE, the priority indication to a GERAN when the GERAN initiates the service comprises:
    sending, by the UE, a channel request message to the GERAN, wherein an establishment cause in the request message serves as the priority indication, and the establishment cause is filled in as an emergency call.

5. The method for processing prior services according to claim 1, wherein the sending, by the UE, the priority indication to a UTRAN when the UTRAN initiates the service comprises:
    sending, by the UE, a radio resource connection SETUP request message to the UTRAN, wherein an establishment cause in the request message serves as the priority indication, and the establishment cause is filled in as a terminating high priority signaling or an emergency call.

6. A User Equipment (UE), comprising:
    a processor; and
    a memory comprising processor executable instructions that, when executed by the processor, configure the UE
    to receive a message carrying a priority indication corresponding to a service sent by an evolved Node B (eNB) and/or a Mobility Management Entity (MME) in mobile terminating call procedures for Circuit Switched Fallback (CSFB), and
    to send the priority indication to a GSM EDGE Radio Access Network (GERAN) or a Universal Terrestrial Radio Access Network (UTRAN) when the GERAN or the UTRAN initiates the service.

7. The UE according to claim 6, wherein the UE is further configured
    to send a channel request message to the GERAN, wherein an establishment cause in the request message serves as the priority indication, and the establishment cause is filled in as an emergency call, or
    to send a radio resource connection SETUP request message to the UTRAN, wherein an establishment cause in the request message serves as the priority indication, and the establishment cause is filled in as a terminating high priority signaling or an emergency call.

8. A system for processing prior services, comprising the UE according to claim 6, an evolved Node B (eNB), and a Mobility Management Entity (MME), wherein the eNB and/or the MME is configured to carry the priority indication corresponding to the service in the message sent to the UE in mobile terminating call procedures for CSFB.

9. The system for processing prior services according to claim 8, wherein the eNB is further configured to carry the priority indication corresponding to the service via radio connection releasing request message and/or a paging message sent to the UE when the UE is in an idle state.

10. The system for processing prior services according to claim 8, wherein the MME is further configured to carry the priority indication corresponding to the service via a Circuit Switched (CS) service notifying message sent to the UE when the UE is in a connected state.

11. The system for processing prior services according to claim 8, wherein the eNB is further configured to carry the priority indication corresponding to the service via a radio connection releasing request message sent to the UE when the UE is in a connected state.

12. The system for processing prior services according to claim 10, wherein the eNB is further configured to carry the priority indication corresponding to the service via a radio connection releasing request message sent to the UE when the UE is in a connected state.

13. The system for processing prior services according to claim 8, wherein the UE is further configured to send a channel request message to the GERAN, wherein an establishment cause in the request message serves as the priority indication, and the establishment cause is filled in as an emergency call, or to send a radio resource connection SETUP request message to the UTRAN, wherein an establishment cause in the request message serves as the priority indication, and the establishment cause is filled in as a terminating high priority signaling or an emergency call.

* * * * *